July 5, 1932.  F. H. MACNEIL  1,866,365
ELECTRIC SWITCH GEAR AND SWITCH AND DOOR LOCKING MECHANISM
Filed Oct. 31, 1929  3 Sheets-Sheet 1

Fig. 1.

Inventor.
Frederick H. MacNeil

July 5, 1932.  F. H. MACNEIL  1,866,365

ELECTRIC SWITCH GEAR AND SWITCH AND DOOR LOCKING MECHANISM

Filed Oct. 31, 1929    3 Sheets-Sheet 2

Inventor,
Frederick H. MacNeil
by
atty.

Patented July 5, 1932

1,866,365

UNITED STATES PATENT OFFICE

FREDERICK H. MACNEIL, OF BOSTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC SWITCH GEAR AND SWITCH AND DOOR LOCKING MECHANISM

Application filed October 31, 1929. Serial No. 403,890.

This invention relates to high tension cell-enclosed electric switch gear in which the main switch is mounted on a wheeled support on which it is adapted to be moved into and out of the cell and when within the cell is adapted to occupy a circuit controlling position in which the terminal members thereof, which constitute the movable contact members of isolating switches, are in engagement with the cooperating fixed contact members of line and bus terminals carried by the cell structure, which terminals are adapted to be connected by means of manually operable knife blade disconnecting switches either with the high tension bus or with a grounded bus which is located within the high tension bus compartment of the cell. The bus compartment which is separate from the switch compartment is provided with a removable front closure or door which, when it is open, gives access to the knife blade disconnecting switches by which the line and bus terminals are adapted to be disconnected from and connected with the aforesaid buses.

It is an object of this invention to provide means for preventing the operation of the disconnecting switches when the main switch is in its circuit controlling position in the cell unless the separable contact members of the main switch are in contact open position; and, more specifically, to provide locking means for the bus compartment door, which locking means is governed by the open and closed condition of the main switch whereby to prevent access to the aforesaid disconnecting switches when the main switch is in circuit controlling position within the cell and the contacts thereof are closed.

When the main switch is moved to and from its circuit controlling position in the cell, the terminal contact members thereof are arranged automatically to engage and disengage the cooperating fixed contact members of the line and bus terminals and it constitutes a further object of the invention to provide cooperating fixed and movable locking members carried by the cell and switch for controlling the locking and unlocking of the bus compartment, which members are arranged to be moved automatically into and out of operative engagement by corresponding movements of the switch into and out of its circuit controlling position in the cell.

It is a still further object of the invention to provide means to prevent closing of the main switch after it has been moved into its circuit controlling position within the cell unless the bus compartment door is latched in closed position.

A yet further object is the provision of means to give visual indication of the unlatched condition of the bus compartment door.

A further object is generally to improve the construction and operation of enclosed electric switch gear.

The switch gear here shown to illustrate the invention includes a cell structure having a rear wall 10, a top wall 12, and the side walls 13 and 14. The cell structure also includes a horizontal partition wall 16 spaced below said top wall 12 to provide a bus compartment A, a vertical partition wall 18 which is in front of and is spaced from said rear wall 10 to provide a compartment B for the outgoing lines, and a vertical partition 19 which provides a rear wall for the compartment C which is disposed in the foremost portion of the cell beneath compartment A and contains the fixed contact members 20 of secondary disconnecting switches, the co-operating movable contact members of which are carried by the main switch, as will presently appear. Said secondary switches control the connection of the circuits between the switch operating and associated mechanism carried by the truck and remotely disposed switch and signal mechanisms.

A pair of high tension insulating bushings 22 and 24 are carried by and extend through the partition wall 16 and support the vertical conducting studs 26 and 28. Said studs are provided with lower extended end portions 30 and 32 which are in the form of knife blades and constitute the stationary switch members of a pair of bus and line isolating switches of which the spaced terminals 34 and 36 of the main switch constitute the co-operating movable members. Said stud 26 is connected electrically at its upper end with a pivotal support 38 of a knife blade disconnecting switch 40 which is adapted to make engagement at its free end with fixed contact jaws 42 which are electrically connected with the high tension line bus 44. Said disconnecting switch 40 has an eye 41 which is adapted to be engaged by a switch hook for operating it; but it can be operated only when the bus compartment is open. Said other stud 28 is connected electrically at its upper end with an outgoing line conductor 46 which passes through an insulating bushing 48 into compartment B. A third high tension insulating bushing 50 is extended through said partition wall 16 in the same vertical plane as said bushings 22 and 24 and is provided with a vertical conducting stud 52 formed at its lower end with a knife blade contact 54 similar to contacts 30 and 32 and at its upper end is provided with resilient contact jaws 56 which are similar to and are in the same vertical plane as the contact jaws 42 and which are aligned with the movable disconnecting switch blade 40 with which they cooperate in the horizontal position of the latter. Said stud 52 is electrically connected at its upper end with a grounded bus 58.

The main switch, or circuit interrupter, is of the oil immersed type, a single phase unit being herein shown. Said switch comprises essentially an enclosing casing including the oil receptacle 60 and the upper switch frame 62 which latter forms a closure for the open top of the oil receptacle.

Said switch frame and oil receptacle are supported removably in position by means of tie rods 64 which extend at their upper ends through laterally-extended bosses 66 of the switch frame and at their lower ends through a channel-shaped bottom supporting platform 68 disposed beneath the receptacle.

The stationary switch members of the interrupter include the insulating bushings 70 and the conducting studs 72 which are extended axially through the bushings. Said studs extend into the oil in the receptacle 60 and also above said switch frame and terminate in the aforesaid contact members 34 and 36 which comprise the movable contact members of the bus and line isolating switches. Remotely-controlled, electrically-actuated, switch-operating mechanism 74 having an operative connection with the movable contact members of the interrupter, not shown, is mounted on a front wall, or panel, 77, which is carried by and is movable with the main switch and which provides, in the position of the switch shown in Fig. 1, the front closure for the switch compartment of the cell.

The interrupter is adapted to be supported above the floor at any one of a number of different elevations while within the switch compartment of the cell and, to this end, it is provided with self-contained raising and lowering means. Said means includes two similar pairs of crossed arms 76 and 78, one pair being located on each side of the switch below the bottom thereof.

Figure 1:
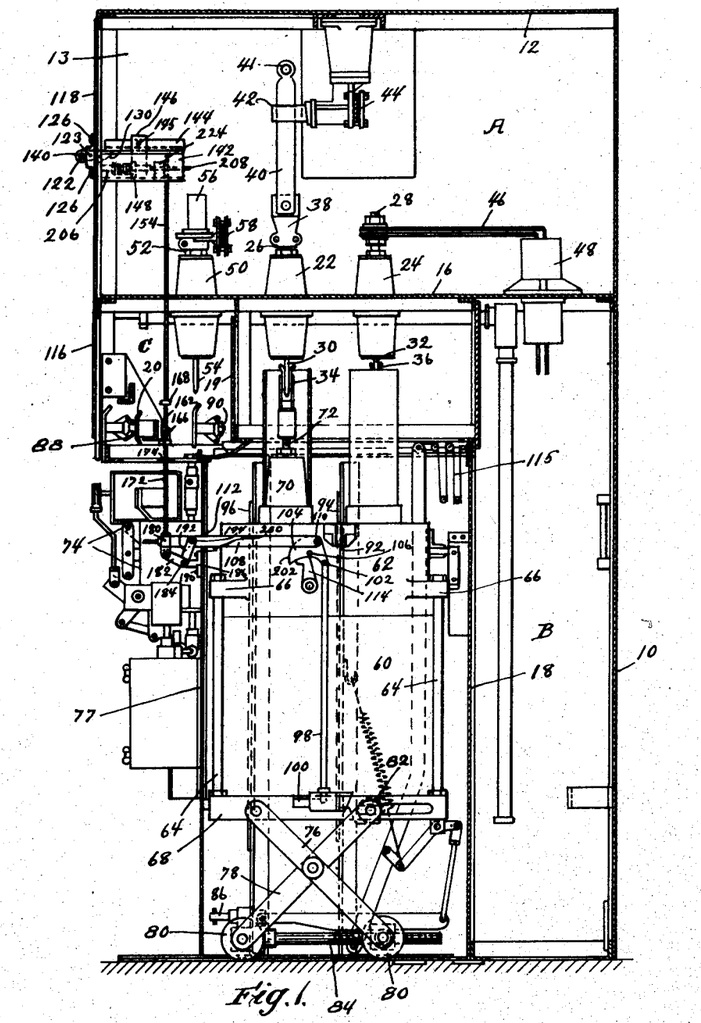
Fig. 1 is a side elevation of an electric switch gear embodying the invention, the enclosing cell being shown in section.
Figure 2:
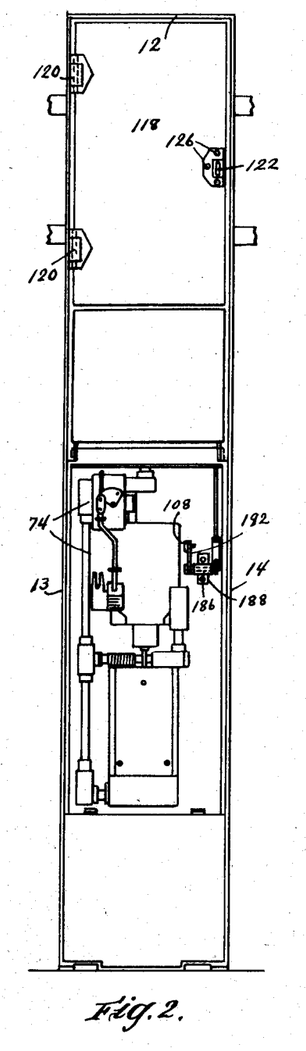
Fig. 2 is a front elevation of the switch gear of Fig. 1.

Said arms are provided at their extreme lower ends with suitable switch supporting wheels 80 and, at their upper ends, the arms 76 are connected pivotally with the bottom supporting member 68 which is in the form of a channel frame. The arms 78 are provided with a lost-motion connection with said channel frame 68, and rollers 82 are pivotally carried by the upper ends of said arms and bear against and roll along the inner face of said channel frame 68. The lower ends of said arms 76 and 78 are operatively connected for movement toward and away from each other by a shaft 84 journalled in the lower ends of the arms 78 and having a screw threaded connection at its other end with the lower ends of arms 76. A pinion shaft 86 which is adapted to be rotated in either direction by a detachable hand crank, not shown, has a geared-down connection with the operating shaft 84. It will be apparent that when the operating shaft 84 is rotated in one direction the lower ends of arms 76 and 78 will be drawn toward each other, thus to raise the interrupter; and when the shaft is rotated in a reverse direction, the lower ends of said arms will be moved apart, thus to lower the interrupter. As shown in Fig. 1, the interrupter is in its fully raised or service postion wherein the stationary and movable contact members of the isolating switches are in engagement and the service contacts 88 of the secondary disconnecting switches are in engagement with the cooperating fixed contacts 20. When in its fully lowered position, the contact members of said isolating switches will be separated and the switch terminals 34 and 36 will occupy a position below the bottom of the compartment wall 19 of the cell structure, in which position the interrupter can be rolled horizontally on wheels 80 into a position remote from the cell. The switch is adapted to occupy a second elevated position in the cell, called the test position, in which the terminals 34 and 36 thereof are disposed in vertical alignment with the knife blade terminals 54 and 30, respectively, and in which the test contacts 90 of the secondary switches are in engagement with the fixed contacts 20 of the cell. If it is desired to move the interrupter to its test position, the interrupter is rolled only partly from its cell and is again elevated into the aforesaid test position. In this position of the switch, the secondary circuits of the interrupter are connected electrically with conveniently located test terminals and the blade 40 of the disconnecting switch is adapted to be moved out of engagement with the contact jaws 42 and into engagement with the grounded contact jaws 56, whereby to disconnect the switch from the high tension bus 44 and also to ground both terminals of the interrupter should it be closed.

Means are provided to guide the switch in its vertical movement into and out of both its test and service positions. Said means includes guide members carried by the switch frame 62 having bifurcations 92 which are vertically aligned with and are adapted to receive therebetween vertical guide rails 94 and 96 as the switch is elevated into its service and test positions respectively.

Means are provided to lock the raising and lowering means against operation except when the interrupter is in its fully open position. Said means include a locking bar 98, adapted to enter an aperture in a member 100 which member is slidable horizontally on the platform 68 as the arms 76 and 78 are moved to raise and lower the switch. Said lock bar 98 is pivotally connected at 102 to a cam plate 104 which is pivoted at 106 to the switch frame 62. A horizontal finger lever 108 is also pivotally secured at 110 to said cam plate 104 and extends forwardly through a slot 112 in the front wall 77 into a position to be grasped by the operative from the front of the switch. A cam 114 is operatively connected with the switch operating mechanism, not shown, and cooperates with the cam plate 104 to prevent improper operation both of the switch and the raising and lowering means therefor.

The above described raising and lowering means and the interlocking means are more fully described and are claimed in a copending application of Morris B. Wood, Serial No. 281,151, filed May 28, 1928, and assigned to the assignee of this application, and need not be further described herein.

A shutter 115 is arranged to be moved automatically under the stationary members of the isolating switch when the main switch is lowered and withdrawn from the cell. The shutter and its associated parts and mechanism are described and claimed in my copending application Serial No. 400,537, filed October 18, 1929.

The compartment C which contains the secondary disconnecting switches is adapted to be electrically isolated from the remainder of the switch compartment and, to this end, the partition wall 19 thereof is of some suitable insulating material as ebony asbestos. The plate 116 which forms the front closure for compartment C, is secured to the cell structure by means of screws accessible from the front thereof so that the secondary disconnecting switches can be inspected at any time by the operative and in any position of the main switch without danger from the high tension apparatus.

Figures 6, 7:
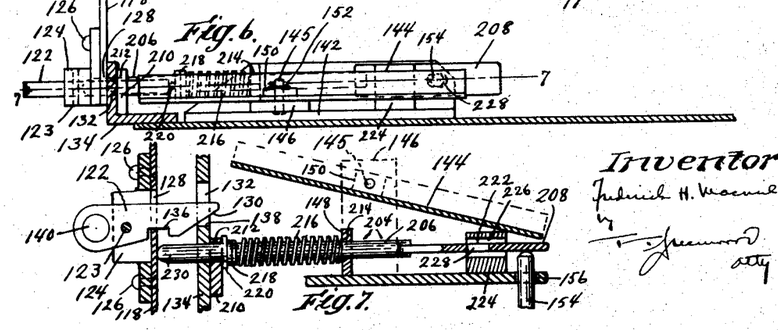
Fig. 6 is a sectional view showing in plan the plunger rod and latch associated with the bus compartment door.
Fig. 7 is a section taken along line 7—7 of Fig. 6.

The open front of bus compartment A is provided with a door 118 which is supported by hinges 120 located adjacent the side wall 13 of the cell. A latch 122 is pivoted at 123 in a latch housing 124 which is secured to the outside of the door adjacent the side wall 14 of the cell by means of rivets 126. Said door is provided with a slot 128 through which the latch extends. As shown most clearly in Fig. 7, said latch is provided with an inwardly extended end portion having the lower inclined face 130 which is adapted to engage and override the bottom edge 138 of an aligned slot 132 in one leg of the vertical corner angle 134 of the cell structure. Said latch is normally biased by gravity into a position wherein the notch 136 therein overlies and engages the edge 138 of said angle whereby to hold the door 118 latched releasably in closed position. Said notch 136 is also arranged to receive the lower edge of slot 128 in the door to provide a stop to limit the downward movement of the latch when it is free from latching engagement with the cell angle 134 as shown in Fig. 7. The latch is also provided with a portion extended forwardly of the door 118 which has an aperture 140 by which it is adapted to be engaged and depressed for unlatching the door.

Figure 3:
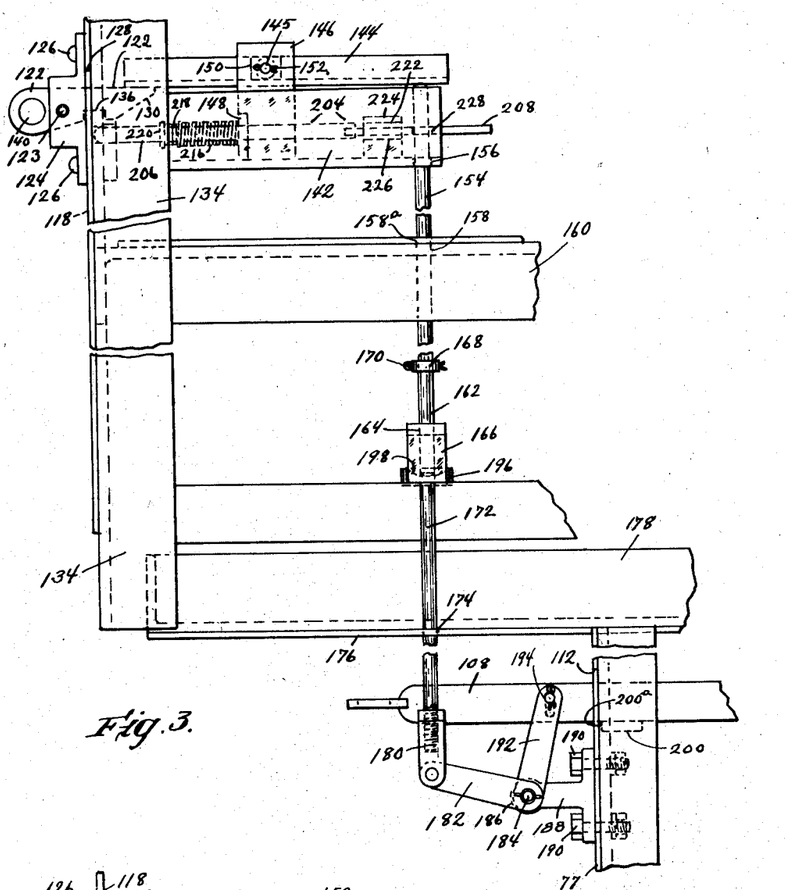
Fig. 3 is an enlarged side elevation of a part of the switch gear in the vicinity of the bus compartment showing the mechanism for interlocking the switch and bus compartment door, the side plate of the cell being removed.
Figures 4, 5:
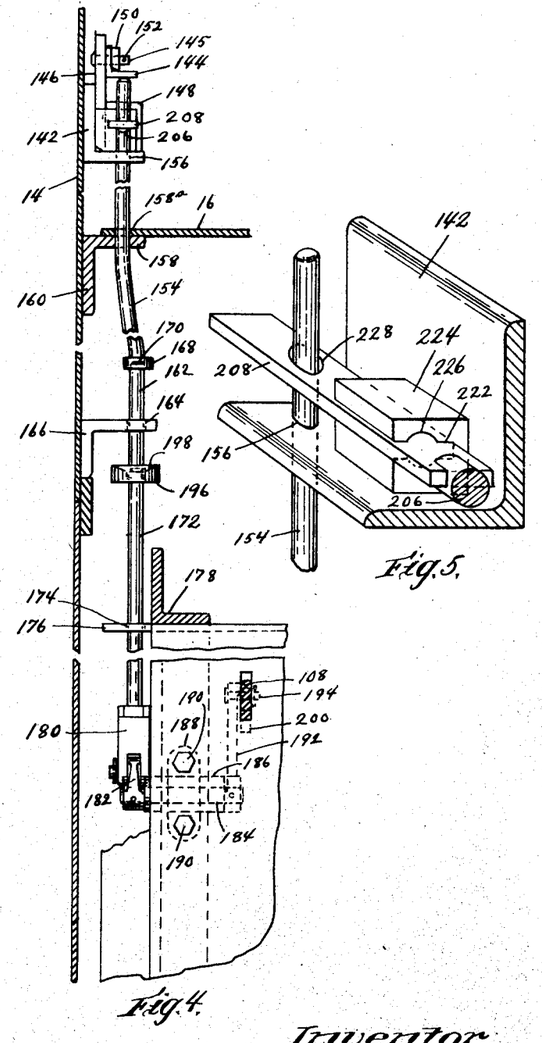
Fig. 4 is a view of the interlocking mechanism of Fig. 3 from the rear of the cell.
Fig. 5 is a perspective view of the plunger rod and the guide block which constitutes the rear support therefor.

Means are provided to lock said door 118 in its closed and latched position whenever the main switch is in service position in the cell and closed, and to permit the release of said latch and the opening of the door only when the switch is open whereby to prevent the operation of the disconnecting switch 40 when the circuit through the main switch is closed. Said means includes a housing 142 of angular section which is secured by welding to the side wall 14 and also at one end to the vertical angle 134 of the cell. As shown in Figs. 3 and 4, a horizontal lock lever 144 of angle section is pivoted on a pin 145 which is permanently secured at one end in one leg 146 of an upstanding guide bracket carried by said housing intermediate its ends. Said guide bracket is of angular section and has the other leg 148 thereof cut away at the top to provide room for free pivotal movement of the lock lever 144. Said lock lever is provided with a bearing block 150 which is welded to the vertical leg thereof and which has a passage to receive the pin 145, the block 150 cooperating with the vertical leg of the lock lever to provide a suitable bearing surface for the lever. Said lever is secured removably on pin 145 by means of a cotter pin 152 that extends through the extended end thereof. In the horizontal position of said locking lever 144, its forward end overlies the inwardly extended end of latch 122, thus to prevent unlatching of the door. A vertical lock plunger 154 is disposed beneath and is adapted, under certain conditions, to be elevated into engagement with the opposite end of said lock lever 144 whereby to hold said lever in the horizontal position in which it overlies the top of latch 122. Said lock plunger 154, as shown most clearly in Figs. 3 and 4, is guided for vertical movement in the cell in vertically aligned guide passages 156 and 158 in said housing 142 and in the horizontal leg of an angle 160 which latter constitutes one side of a peripheral angle frame in the cell for the support of the compartment wall 16. Said wall 16 is also provided with a passage 158a aligned with said passage 158 through which said lock plunger 154 is adapted to pass. Said lock plunger 154 is formed with a slightly offset portion 162 at its lower end which is slidably received in a guide passage 164 in the horizontal leg of an angle-bracket 166 which is secured by welding to the side wall 14 of the cell. A collar 168 is secured to said lock plunger 154 by means of a cotter pin 170 which extends through said lock washer and plunger and is adapted, in the lowermost position of the plunger, to engage the horizontal leg of bracket 166 whereby to limit the downward movement of the plunger. It will be evident that when the locking lever 144 is held by the lock plunger 154 in its horizontal position, as shown in Fig. 3, that the latch 122 cannot be operated to release the door 118. However, when the plunger rod 154 is in its lowered position, the locking lever 144 is rotated by gravity into the position shown in Fig. 7 wherein it is free from holding engagement with the latch and permits the latch to be operated.

Means are carried by the movable switch governed by the open and closed condition thereof arranged to co-operate with said cell-carried locking means whereby to permit the locking and unlocking of said bus compartment door. Said means includes a plunger lifting rod 172 which is disposed in vertical alignment with the lower offset end portion 162 of the plunger rod 154. Said lifting rod is supported for vertical movement in a guide passage 174 in a plate 176 which is secured by welding to the bottom of the horizontal leg of an angle 178 which constitutes a part of the truck frame. Said lifting rod is provided, at its lower end, with a yoke 180, the bifurcated ends of which are connected with an arm 182 which is fixed at its other end to a shaft 184 journalled in a bearing 186 of a forwardly-extended bracket 188 which is secured to the front panel wall 77 of the truck by bolts 190. As shown most clearly in Fig. 4, said shaft 184 is provided with a second upstanding arm 192 at its opposite end, the upper end of which arm is pivoted at 194 to the finger lever 108. Said lifting rod 172 carries, at its upper end, a disc 196 having a concave upper surface 198 which is disposed beneath the lower offset end of the plunger rod 154. The lifting rod 172 is sufficiently loose in aperture 174 to permit slight movement of rod 172 out of a vertical position due to the rotation of lever 182 but the disc 196 thereof is always beneath and in position to engage the lower end of rod 154 when the switch is in elevated position in the cell. In the position shown in Fig. 1, the finger lever 108 has been moved into its extreme right hand position wherein the locking lever 144 is in locking engagement with the latch 122. In this position of the parts, a block 200 which is welded to the lower edge of finger lever 108 has the front edge 200a thereof disposed behind the front wall 77 of the switch, as shown most clearly in Fig. 3, whereby to lock the parts releasably in this position. It will be noted that when the finger lever 108 is in the above position, the cam plate 104 is so disposed in relation to cam 114 that the switch may be opened and closed; but that the locking plunger 98 is in its lowermost position in which the raising and lowering means for the switch is prevented from operation.

Before the bus compartment door 118 can be opened to operate the disconnecting switch 40, it will be necessary to open the main switch, in which position of the switch the crank 114 is moved from beneath the cam plate 104 whereby to permit the finger lever 108 to be moved to the left, as viewed in Fig. 1. In this position of the cam plate, the end portion 202 thereof is disposed in the path of movement of the cam 114 and prevents the closing of the switch. Movement of the finger lever to lock the switch open also causes a simultaneous counter-clockwise rotation of the bell crank and consequent lowering of the locking plunger 154 and clockwise rotation of lever 144. The latch 122 is then free to be released from latching engagement with the latch-engaging portion 138 of the cell. Thus, it will be evident that the bus compartment door 118 can never be open when the main switch is in circuit controlling position unless the main switch is open, and that the closing of the switch can never be accomplished until the finger lever 108 has been operated to simultaneously unlock the switch and raise the locking plunger 154 into locking position.

Means are also provided which make it impossible to move the door locking mechanism to locked position unless the door 118 is closed and latched. Said means, as shown in detail in Figs. 6 and 7, includes a plunger rod 204 which has a front cylindrical portion 206 and a rearwardly extended flat rectangular section 208. The cylindrical portion of said plunger rod is guided for limited horizontal movement between the positions shown in Figs. 6 and 7. To this end, the vertical corner angle 134 of the cell and a rectangular block 210 which is welded thereto are provided with a guide passage 212 in which the forward cylindrical end of said plunger rod is slidably received. Said cylindrical portion of the plunger rod is also extended through an aperture 214 in the short leg 148 of bracket 146 (see Figs. 3 and 4). A compression spring 216 is carried by the cylindrical portion of said plunger rod and has one end thereof bearing against leg 148 and the other end against a washer 218 which is held against displacement on the rod by a tapered pin 220 carried by the rod. The effect of the spring 216 is constantly to bias said plunger rod into the position shown in Fig. 7 wherein it is extended through and beyond the front face of angle 134 and in which position it is behind and in the path of movement of the door 118. As shown most clearly in Fig. 5, the rectangular rearwardly extended end of said plunger rod is received in a horizontal slot 222 of a guide block 224 which is welded between the angularly-related legs of the housing 142. Said block is further provided with a cylindrical bore 226 which is aligned with the cylindrical portion 206 of the plunger rod whereby to permit the withdrawal of the plunger rod from the housing. Said rectangular portion of plunger rod 204 is provided with a vertical horizontally-elongated passage 228 which is adapted to be in vertical alignment with the locking plunger 154 in that position of the plunger rod 204 in which the latter is held by door 118 in its rearmost position, as shown in Fig. 6, whereby to permit the upward movement of the locking plunger 154 into locking engagement with the locking lever 144. If, however, the bus compartment door 118 is in any but the closed position thereof, due to the action of spring 216, the plunger rod 204 will occupy some such position as that shown in Fig. 7, wherein its forwardly extended end 230 will project a substantial distance beyond the front of the cell, and the vertical passage 228 thereof will be disposed in some position in front of and out of vertical alignment with the vertical plunger rod 154. It will be evident that when the passage 228 and the locking plunger 204 are in the position shown in Fig. 7, it will be impossible to move the finger lever 108 into its rearmost position wherein the main switch is unlocked due to interference of the rectangular end portion 208 of said plunger rod with said locking plunger 154.

By the provision of the above described locking means, it will be evident that to gain access to the disconnecting switch 40, when the main switch is in circuit controlling position, the main switch must be open; and also that to put the switch in service, it is first necessary to close and latch the bus compartment door 118.

The mechanism herein described and claimed is shown and described but not claimed, in my previously-identified application.

Various modifications may be made in the construction of the switch without departing from the scope of the invention.

I claim:

1. In an electric switch gear, the combination of an enclosing cell having a bus compartment and a switch compartment, a main switch and an isolating switch in said switch compartment, means to raise and lower said main switch to close and open said isolating switch, a bus in said bus compartment, a disconnecting switch in said bus compartment for connecting said main and isolating switches with said bus compartment, a door for said bus compartment, a lock for said door, and locking mechanism for said raising and lowering means having means controlling said lock of said door.

2. In an electric switch gear, the combination of an enclosing cell having a bus compartment and a switch compartment, a main switch and an isolating switch in said switch compartment, means to raise and lower said main switch to close and open said isolating switch, a bus in said bus compartment, a disconnecting switch in said bus compartment for connecting said main and isolating switches with said bus compartment, a lock for said door, locking and unlocking mechanism for said raising and lowering means having locking means therefor governed by the condition of said main switch and also having means controlling the locking of said door which provides for the independent locking and unlocking of said door when the switch is open.

3. In an electric switch gear, the combination of an enclosing cell having a bus compartment and a switch compartment, a main switch located in said switch compartment, a disconnecting switch for controlling the circuit through said main switch located in said bus compartment and having means by which it can be operated only when the bus compartment is open, a door closing said bus compartment, and means for locking said door closed providing for the opening thereof only when said main switch is open.

4. In an electric switch gear, the combination of an enclosing cell having a bus compartment and a switch compartment, a main switch located in said switch compartment, a disconnecting switch for controlling the circuit through said main switch located in said bus compartment and having means by which it can be operated only when the bus compartment is open, a door closing said bus compartment, a lock for said door and means governed by the condition of said main switch for holding said lock against unlocking movement except when said main switch is open.

5. In an electric switch gear, the combination of an enclosing cell having a bus compartment and a switch compartment, a main switch located in said switch compartment, a disconnecting switch for controlling the circuit through said main switch located in said bus compartment and having means by which it can be operated only when the bus compartment is open, a door closing said bus compartment, a lock for said door normally held in door-locking condition, and having manual means to release it, and manually-operated locking mechanism for said lock having means controlled by the condition of the switch for holding said lock against operation except when said main switch is open, whereby to prevent access to said disconnecting switch except when said main switch is open.

6. In an electric switch gear, the combination of an enclosing cell including a bus compartment having a high tension bus therein, a switch compartment, a truck type switch adapted to occupy said switch compartment, a disconnecting switch disposed within said bus compartment and controlling the electric connection between said switch and said bus, a door for said bus compartment, and means governed by the open and closed condition of said switch to lock said door in closed position including means carried by said truck type switch adapted to be automatically connected with and disconnected from said locking means by corresponding movements of said switch into and out of said switch compartment.

7. In an electric switch gear, the combination of an enclosing cell including a bus compartment and a switch compartment, a truck type switch adapted to be moved into said switch compartment and when therein to provide a closure for said switch compartment, a disconnecting switch disposed in said bus compartment controlling the electric connection through said switch, a door providing a closure for said bus compartment having means to latch it in closed position, means carried by the cell movable into and out of holding engagement with said latching means, and cooperating means carried by the switch and governed by the closed and open condition thereof arranged to control said holding means.

8. In an electric switch gear, the combination of an enclosing cell including a bus compartment and a switch compartment, a truck type switch adapted to be moved into said switch compartment and when therein to provide a closure for said switch compartment, a disconnecting switch disposed in said bus compartment controlling the electric connection through said switch, a door providing a closure for said bus compartment having means to latch it in closed position, means carried by the cell movable into and out of holding engagement with said latching means, and cooperating means carried by the switch and governed by the closed and open condition thereof arranged to control said holding means, said cooperating means carried by the switch arranged to be moved automatically into and out of engagement with said latch holding means by corresponding movements of the switch into and out of the cell.

9. The combination of an enclosing cell, an electric switch having operating mechanism, raising and lowering means therefor, means interlocking said switch operating mechanism and raising and lowering means, a separate bus compartment having a removable closure therefor, means to lock said closure in closed position, means interlocking said locking means with said switch operating mechanism, and manually operative means simultaneously controlling the operation of both said interlocking means.

10. The combination of an enclosing cell, an electric switch adapted to be moved into and out of a circuit controlling position in said cell and having switch operating mechanism, a separate bus compartment in said cell having a disconnecting switch therein, a door forming a removable closure for said bus compartment having locking means to lock it in closed position, means to hold said locking means in door-locking condition, and means carried by said electric switch and governed by the open and closed position of said switch operating mechanism when said electric switch is in circuit controlling position arranged to move said holding means into and out of holding position with said locking means.

11. The combination of an enclosing cell, an electric switch therein having switch operating mechanism, a separate bus compartment in said cell having a disconnecting switch therein that is in the circuit of said electric switch, a door forming a removable closure for said bus compartment having means including a latch for releasably locking the door closed both when said electric switch is closed and open, whereby said disconnecting switch can be opened only when said door is unlocked and open, and means governed by the condition of said switch operating mechanism for holding said latch against release of said door except when said electric switch is open.

12. The combination of an enclosing cell having separate bus and switch compartments therein, a truck type switch adapted to be moved into a circuit controlling position in said switch compartment, switch operating mechanism for said switch, a disconnecting switch disposed in said bus compartment and connected electrically in the circuit through said switch, means to move said switch into and out of its circuit controlling position, means to lock said switch against movement into and out of its circuit controlling position, a door forming a closure for said bus compartment having means to lock it in closed position, cooperating means carried by the cell and switch controlling said door-locking means, and manual means controlling the simultaneous operation of said door-locking and switch-locking means, said manual means and said switch operating mechanism having interlocking members arranged to prevent the operation of said manual means except when the switch is open and also for preventing the closing of the switch when said manual means has been operated to release said door-locking and switch-moving means.

13. In an electric switch, the combination of an enclosing cell, a switch adapted to be moved into and out of a circuit controlling position in the cell, operating mechanism for the switch, a high tension bus compartment, a disconnecting switch located therein and connected electrically in series with the circuit through said switch, a door for said bus compartment having means to lock it in closed position, and means interconnecting the locking means for said door with said switch operating mechanism including cooperating manually operable members carried by said switch and cell.

14. In an electric switch, the combination of an enclosing cell, a switch adapted to be moved into and out of a circuit controlling position in the cell, operating mechanism for the switch, a high tension bus compartment, a disconnecting switch located therein and connected electrically in series with the circuit through said switch, a door for said bus compartment having means to lock it in closed position, and means interconnecting the locking means for said door with said switch operating mechanism including cooperating manually operable members carried by said switch and cell, said members arranged to be automatically connected and disconnected by corresponding movements of said switch into and out of the cell.

15. In an electric switch gear, the combination of an enclosing cell having an upper bus compartment and a lower switch compartment, a partition wall therebetween, a high tension bushing extended through said wall and having terminals disposed in said bus and switch compartments, a disconnecting switch connecting the terminal in said bus compartment with a high tension bus therein, an electric switch adapted to occupy a position in said compartment wherein a terminal thereof is in engagement with the aforesaid high tension terminal of said switch compartment, a door for said bus compartment permitting access to said disconnecting switch, means to lock said door in closed position, and means interconnecting said door-locking means with said switch operating mechanism arranged to prevent the improper operation of both, said interconnecting means arranged to permit the unlocking of said door only when said switch is in open position and also permitting closing of the switch only when the door is in closed and locked position.

16. An electric switch gear including an enclosing cell having bus and switch compartments, a truck type circuit interrupter movable into and out of said switch compartment, a manually operable disconnecting switch disposed within said bus compartment and connected electrically in the circuit controlled by said interrupter, a door forming a closure for said bus compartment having a latch for holding it releasably in closed position, a latch-locking lever pivotally supported intermediate its ends and having one end thereof arranged to overlie said latch, said lever being normally biased into a position free from holding engagement with said latch, a locking plunger carried by the cell arranged to engage the other end of said lever and move it against its bias into engagement with said latch, a lifting lever carried by said truck type interrupter arranged to operate said locking plunger, and manually operable means carried by said interrupter and governed by the open and closed condition of said interrupter for actuating said lifting rods to lock and unlock said bus compartment door.

17. In an electric switch gear, the combination of an enclosing cell having separate switch and bus compartments, a main switch having operating mechanism disposed in said switch compartment, a manually operable disconnecting switch disposed in said bus compartment and connected electrically in the circuit through said switch, a door for said bus compartment having means to latch it releasably in closed position, holding means for said latch preventing the opening of said door, and manual means governed by the open and closed position of the main switch arranged to control the operation of said latch-holding means.

18. In an electric switch gear, the combination of an enclosing cell having separate switch and bus compartments, a main switch having operating mechanism disposed in said switch compartment, a manually operable disconnecting switch disposed in said bus compartment and connected electrically in the circuit through said switch, a door for said bus compartment having means to latch it releasably in closed position, holding means for said latch preventing the opening of said door, and manual means which is independent of said disconnecting switch and has means governed by the condition of said main switch for releasing said latch only when said main switch is open, whereby said door can thus be opened and access gained to said disconnecting switch for operating it.

19. In an electric switch gear, the combination of an enclosing cell having bus and switch compartments open at the front, an electric switch adapted to be moved into and out of said switch compartment and having means when therein to form a closure for the open front thereof, a door providing a closure for the open front of said bus compartment, means to lock said door in closed position, manually-operable means carried by the switch and governed by the open and closed condition thereof controlling the operation of said door-locking means, and means carried by the cell and cooperating with said door arranged to prevent the operation of said manual means to lock the door until said door is in its closed position.

20. An enclosed electric switch gear including a cell having switch and bus compartments, a truck type switch adapted to be moved into and out of said switch compartment, a manually operable disconnecting switch disposed within said bus compartment and connected electrically in the circuit controlled by said interrupter, a door forming a closure for said bus compartment having a latch for holding it releasably in closed position, latch-holding means carried by the cell arranged when operated to hold said latch and consequently said bus compartment door locked in closed position, cooperating means carried by said interrupter for actuating said latch-holding means, and means associated with said bus compartment door for preventing the actuating of said latch-holding means except when said door is in the closed and latched position.

21. An enclosed electric switch gear including a cell having switch and bus compartments, a truck type switch adapted to be moved into and out of said switch compartment, a manually-operable disconnecting switch disposed within said bus compartment and connected electrically in the circuit controlled by said interrupter, a door forming a closure for said bus compartment having a latch for holding it releasably in closed position, latch-holding means carried by the cell arranged when operated to hold said latch and consequently said bus compartment door locked in closed position, cooperating means carried by said interrupter and governed by the open and closed position thereof for actuating said latch-holding means, and means governed by the open and closed position of said bus compartment door for preventing the movement of said actuating means to operate said latch-holding means except in the closed and latched position of said door.

22. An electric switch gear including an enclosing cell structure having separate bus and switch compartments, a truck type circuit interrupter movable into and out of said switch compartment, a manually- operable disconnecting switch located in said bus compartment, and connected electrically in the circuit through said interrupter, means carried by the cell movable into and out of locking engagement with said latch, manually operable means carried by said interrupter for actuating said locking means, and means to lock said manually operable means against operation except in the closed and latched position of said door including a plunger slidably mounted in said cell and normally projecting from the front thereof into a locking position in which it is in the path of movement of said manually operative means.

23. An electric switch gear including a cell having separate bus and switch compartments, a truck type switch movable into and forming a closure for said switch compartment, a door forming a removable closure for said bus compartment having means to lock it in closed position, manual means carried by said switch and governed by the open and closed condition thereof for actuating said door-locking means, and means carried by said cell and responsive to the opening and closing of said door for preventing the movement of said door locking means to locking position except in the closed position of said door.

24. An electric switch gear including a cell having separate bus and switch compartments, a truck type switch movable into and forming a closure for said switch compartment, a door forming a removable closure for said bus compartment having means to lock it in closed position, manual means carried by said switch and governed by the open and closed condition thereof for actuating said door-locking means, a housing carried by said cell adjacent said door, a plunger slidably mounted in said housing and biased into a position in which it projects from the front of said housing into a position to be engaged and moved rearwardly in said housing by the closing movement of said door, said plunger, in the aforesaid projecting position, arranged to prevent the operation of said manual means to lock said door-locking means.

25. In an electric switch gear, the combination of an enclosing cell having separate switch and bus compartments both open at the front, an electric switch including switch operating mechanism movable into and out of a circuit controlling position in said switch compartment through the open front thereof and when disposed therewithin adapted to provide a closure for said open front, a door forming a removable closure for the open front of said bus compartment having means to latch it in closed position, means to lock said door including holding means for said latch arranged to prevent the release thereof, manually controlled means carried by the switch arranged to cooperate with said latch-holding means in the circuit controlling position of said switch to move the latter into and out of latch-holding position, said manual means and said switch operating mechanism having cooperating members arranged to prevent the improper operation of both, whereby to prevent the closing of the switch in any but the locked condition of said door and also to prevent the unlocking of said bus compartment door except when the switch is open.

26. In an electric switch gear, the combination of an enclosing cell having separate switch and bus compartments both open at the front, an electric switch including switch operating mechanism movable into and out of a circuit controlling position in said switch compartment through the open front thereof and when disposed therewithin adapted to provide a closure for said open front, a door forming a removable closure for the open front of said bus compartment having means to latch it in closed position, means to lock said door including holding means for said latch arranged to prevent the release thereof, manually controlled means carried by the switch arranged to cooperate with said latch-holding means in the circuit controlling position of said switch to move the latter into and out of latch-holding position, said manual means and said switch operating mechanism having cooperating members arranged to prevent the improper operation of both, whereby to prevent the closing of the switch in any but the locked condition of said door and also to prevent the unlocking of said bus compartment door except when the switch is open, and means governed by the closed and open position of said door for obstructing the operation of said manual means into door-locking position except in the closed and latched position of said door.

27. An electric switch gear including an enclosing cell having separate switch and bus compartments open at the front, a truck type electric switch adapted to be moved into a circuit controlling position in said switch compartment, a manually operable disconnecting switch disposed in said bus compartment controlling the circuit through said truck type switch, a door forming a closure for the open front of said bus compartment having means to latch it in closed position, means to hold said door in latched position, manual means governed by the open and closed condition of said switch in the circuit controlling position thereof controlling the locking and unlocking of said door, and means governed by the open and closed condition of said door controlling the operation of said manual means.

28. An electric switch gear including an enclosing cell having separate switch and bus compartments open at the front, a truck type electric switch adapted to be moved into a circuit controlling position in said switch compartment, a manually operable disconnecting switch disposed in said bus compartment controlling the circuit through said truck type switch, a door forming a closure for the open front of said bus compartment having means to latch it in closed position, means to hold said door in latched position, manual means governed by the open and closed condition of said switch in the circuit controlling position thereof controlling the locking and unlocking of said door, and means responsive to the opening movement of said door for preventing the operation of said manual means to operate said door locking means.

29. An electric switch gear including an enclosing cell and separate bus and switch compartments, a truck type switch movable into and out of a circuit controlling position in said switch compartment, a disconnecting switch contained in said bus compartment and controlling the circuit through said truck type switch, a door forming a removable closure for said bus compartment having means to latch it releasably in closed position, means to hold said latch against movement to release said door, manual means carried by said switch and governed by the open and closed condition thereof arranged to control said latch-holding means, and means associated with and engaged by said door in the closed position thereof arranged to bias it constantly into an open position including a spring pressed plunger adapted to project from the front of said bus compartment in the open position of said door.

30. An electric switch gear including an enclosing cell and separate bus and switch compartments, a truck type switch movable into and out of a circuit controlling position in said switch compartment, a disconnecting switch contained in said bus compartment and controlling the circuit through said truck type switch, a door forming a removable closure for said bus compartment having means to latch it releasably in closed position, means to hold said latch against movement to release said door, manual means carried by said switch and governed by the open and closed condition thereof arranged to control said latch-holding means and means associated with and engaged by said door in the closed position thereof arranged to bias it constantly into an open position including a spring pressed plunger adapted to project from the front of said bus compartment in the open position of said door, said plunger having means associated therewith which obstructs the operation of said manual locking means in any position of said plunger except the depressed position thereof when said bus compartment door is fully closed and latched.

31. An electric switch gear including an enclosing cell having separate bus and switch compartments open at the front, a truck type switch forming a closure for the open front of said switch compartment when disposed therein, a door forming a removable closure for said bus compartment, means to lock said door in closed position in any but the switch open position of said truck type switch, and means to prevent the operation of said door-locking means when said door is in any but the fully closed position thereof.

32. An electric switch gear having an enclosing cell including separate bus and switch compartments, a truck type switch movable into a circuit controlling position in said switch compartment including switch operating mechanism, a door forming a removable closure for said bus compartment having means to latch it in closed position, locking means for said latch, means interlocking said latch locking means and said switch operating mechanism arranged to prevent the closing of the switch in any but the closed and latched position of said door, and means associated with said door to give visual indication of the unlatched condition thereof.

33. An electric switch gear having an enclosing cell including separate bus and switch compartments, a truck type switch movable into a circuit controlling position in said switch compartment including switch operating mechanism, a door forming a removable closure for said bus compartment having means to latch it in closed position, locking means for said latch, means interlocking said latch-locking means and said switch-operating mechanism arranged to prevent the release of said latch in the closed position of said truck type switch, said means also arranged to prevent the closing of the switch in any but the closed and latched position of said door, and means including a spring pressed member biasing said door away from its latched position arranged to hold said door ajar in the unlatched position of said latch.

In testimony whereof, I have signed my name to this specification.

FREDERICK H. MACNEIL.